(12) United States Patent
Jiang et al.

(10) Patent No.: US 12,340,691 B2
(45) Date of Patent: Jun. 24, 2025

(54) VEHICULAR LOCALIZATION SYSTEMS, METHODS, AND CONTROLS

(71) Applicant: ClearMotion, Inc., Billerica, MA (US)

(72) Inventors: Yu Jiang, Wellesley, MA (US); Vijayaraghavan Sridhar, New York, NY (US); John Parker Eisenmann, Burlington, MA (US); William Graves, Somerville, MA (US); Michael W. Finnegan, Medford, MA (US)

(73) Assignee: ClearMotion, Inc., Billerica, MA (US)

( * ) Notice: Subject to any disclaimer, the term of this patent is extended or adjusted under 35 U.S.C. 154(b) by 172 days.

(21) Appl. No.: 17/436,012

(22) PCT Filed: Mar. 19, 2020

(86) PCT No.: PCT/US2020/023610
§ 371 (c)(1),
(2) Date: Sep. 2, 2021

(87) PCT Pub. No.: WO2020/191188
PCT Pub. Date: Sep. 24, 2020

(65) Prior Publication Data
US 2022/0189302 A1    Jun. 16, 2022

Related U.S. Application Data

(60) Provisional application No. 62/820,392, filed on Mar. 19, 2019.

(51) Int. Cl.
*G08G 1/0967* (2006.01)
*B60G 17/015* (2006.01)
(Continued)

(52) U.S. Cl.
CPC ....... *G08G 1/096708* (2013.01); *G01C 21/14* (2013.01); *G01C 21/28* (2013.01);
(Continued)

(58) Field of Classification Search
CPC ....... G08G 1/096708; G08G 1/096791; G01C 21/14; G01C 21/28; G01C 21/3691;
(Continued)

(56) References Cited

U.S. PATENT DOCUMENTS 8,589,063 B2   11/2013   Trum
9,053,372 B2    6/2015   Ranganathan et al.
(Continued)

FOREIGN PATENT DOCUMENTS

DE   102008032545 A1   1/2010
DE   102014223475 A1   5/2016
(Continued)

OTHER PUBLICATIONS

International Search Report and Written Opinion for International Application No. PCT/US2020/023610 mailed Aug. 4, 2020.
(Continued)

*Primary Examiner* — Ashley L Redhead, Jr.
(74) *Attorney, Agent, or Firm* — Wolf, Greenfield & Sacks, P.C.

(57) ABSTRACT

Localization systems, including road surface-based localization systems, are disclosed that may work in conjunction with less precise systems, such as GPS, to accurately locate a vehicle on a road segment. Methods and apparatus are disclosed for the identification and selection of landmarks, including road surface-based landmarks.

16 Claims, 5 Drawing Sheets

(51) Int. Cl.
  *G01C 21/14* (2006.01)
  *G01C 21/28* (2006.01)
  *G01C 21/36* (2006.01)
  *B60W 60/00* (2020.01)

(52) U.S. Cl.
  CPC ... *G01C 21/3691* (2013.01); *G08G 1/096791* (2013.01); *B60G 17/015* (2013.01); *B60W 60/001* (2020.02); *B60W 2554/802* (2020.02); *B60W 2554/804* (2020.02); *B60W 2555/20* (2020.02); *B60W 2556/50* (2020.02); *B60W 2556/65* (2020.02); *B60W 2710/22* (2013.01)

(58) Field of Classification Search
  CPC .. G01C 21/26; G01C 21/3644; B60G 17/015; B60W 60/001; B60W 2554/802; B60W 2554/804; B60W 2555/20; B60W 2556/60; B60W 2556/65; B60W 2710/22; G06F 2218/12
  See application file for complete search history.

(56) References Cited

U.S. PATENT DOCUMENTS

| | | | |
|---|---|---|---|
| 9,623,905 | B2 | 4/2017 | Shashua et al. |
| 10,486,485 | B1 | 11/2019 | Levinson et al. |
| 10,901,432 | B2 | 1/2021 | Sridhar et al. |
| 10,953,887 | B2 | 3/2021 | Magnusson et al. |
| 2014/0195112 | A1 | 7/2014 | Lu et al. |
| 2016/0161265 | A1* | 6/2016 | Bagheri ............... G01S 13/89 701/450 |
| 2016/0275715 | A1* | 9/2016 | Matsuo ................ G06T 19/20 |
| 2018/0015801 | A1 | 1/2018 | Mohamed et al. |
| 2018/0025235 | A1 | 1/2018 | Fridman |
| 2018/0079272 | A1 | 3/2018 | Aikin |
| 2018/0217251 | A1 | 8/2018 | Stanley et al. |
| 2018/0247139 | A1* | 8/2018 | Kaneko ............... G08G 1/0962 |
| 2019/0079539 | A1 | 3/2019 | Sridhar et al. |
| 2019/0137275 | A1 | 5/2019 | Choudhury et al. |
| 2019/0145781 | A1* | 5/2019 | Iwai ..................... G06V 20/582 702/150 |
| 2020/0117199 | A1 | 4/2020 | Akella et al. |
| 2020/0139784 | A1 | 5/2020 | Sridhar et al. |
| 2020/0139967 | A1 | 5/2020 | Beller et al. |
| 2020/0211394 | A1 | 7/2020 | King et al. |
| 2021/0055740 | A1 | 2/2021 | Sridhar et al. |
| 2021/0394573 | A1 | 12/2021 | Vente et al. |
| 2022/0082705 | A1 | 3/2022 | Graves et al. |
| 2022/0189302 | A1* | 6/2022 | Jiang .................... G01C 21/26 |
| 2022/0196849 | A1 | 6/2022 | Chen et al. |
| 2022/0212678 | A1 | 7/2022 | Eisenmann et al. |

FOREIGN PATENT DOCUMENTS

| | | | |
|---|---|---|---|
| WO | WO 2012/019691 | A1 | 2/2012 |
| WO | WO 2019/049080 | A2 | 3/2019 |

OTHER PUBLICATIONS

U.S. Appl. No. 16/130,311, filed Sep. 13, 2018, Sridhar et al.
U.S. Appl. No. 16/672,004, filed Nov. 1, 2019, Sridhar et al.
U.S. Appl. No. 17/009,243, filed Sep. 1, 2020, Sridhar et al.
U.S. Appl. No. 17/285,174, filed Apr. 14, 2021, Vente et al.
U.S. Appl. No. 17/477,147, filed Sep. 16, 2021, Graves et al.
U.S. Appl. No. 17/489,924, filed Sep. 30, 2021, Chen et al.
U.S. Appl. No. 17/511,331, filed Oct. 26, 2021, Eisenmann et al.
U.S. Appl. No. 17/560,794, filed Dec. 23, 2021, Giovanardi et al.
U.S. Appl. No. 17/560,825, filed Dec. 23, 2021, Giovanardi et al.
U.S. Appl. No. 17/772,036, filed Apr. 26, 2022, Eisenmann et al.
U.S. Appl. No. 17/773,676, filed May 2, 2022, Eisenmann et al.
PCT/US2020/023610, Aug. 4, 2020, International Search Report and Written Opinion.

* cited by examiner

VEHICULAR LOCALIZATION SYSTEMS, METHODS, AND CONTROLS

RELATED APPLICATIONS

This application is a national stage filing under 35 U.S.C. § 371 of International Patent Application Serial No. PCT/US2020/023610, filed Mar. 19, 2020, which claims the benefit under 35 U.S.C. § 119(e) of U.S. Provisional Patent Application Ser. No. 62/820,392, filed Mar. 19, 2019, the disclosure of each of which is incorporated herein by reference in its entirety.

FIELD

Disclosed embodiments are related to vehicular localization based at least partially on data collected while traversing a road surface.

BACKGROUND

Advanced vehicle features such as, for example, active suspension or autonomous or semi-autonomous driving may rely on highly accurate localization of a vehicle. Currently used localization systems, such as, for example, localization based on global positioning systems (GPS), may not provide sufficient accuracy or resolution in localization for such features. Landmark-based localization offers a potential alternative. However, landmark-based localization methods generally require a priori identification of landmarks and mapping of their absolute location, which can be costly and/or time consuming.

SUMMARY

Various systems and methods for identifying landmarks associated with a road segment are disclosed. In certain embodiments, the identified landmarks may be used to localize a vehicle to a given portion of a road segment. An exemplary method for identifying landmarks includes: while a first vehicle traverses the road segment, collecting data from a first vehicle to obtain a sequence of data; dividing the obtained data sequence into a first series of overlapping snippets, wherein each snippet in the first series is associated with a portion of the road segment; determining a distinctiveness score for each snippet; identifying a first snippet, wherein the first snippet has the highest distinctiveness score of the first series of snippets; designating the first snippet as a first landmark; removing, from the first series of snippets, the first snippet and any snippet that overlaps with the first snippet, to form a second series of snippets; identifying a second snippet, wherein the second snippet has the highest distinctiveness score of the second series of snippets; designating the second snippet as a second landmark; and storing, in computer memory, data characterizing the first landmark, the second landmark, and information about a location of the first landmark and a location of the second landmark. In certain embodiments, the stored information may include a relative location of the second landmark to the first landmark and/or another landmark. In certain embodiments, the location of the first landmark may be stored as a relative location with respect to a location of a previously identified landmark. In certain embodiments, the obtained data sequence may be divided into a first series of non-overlapping snippets. In certain embodiments, subsequent to storing the characteristics of landmarks and their relative positions, the position of a second vehicle on the road may be determined when it encounters one or more of the stored landmarks. In some embodiments, once one landmark is encountered, the encounter with the next landmark may be anticipated by using dead reckoning between landmarks.

Another exemplary method of identifying landmarks in a road segment includes: while a first vehicle traverses the road segment, collecting data from the first vehicle to obtain a sequence of data; dividing the obtained sequence of data into a first series of snippets, wherein each snippet in the first series is associated with a portion of the road segment; determining a distinctiveness score for each snippet; (i) identifying the snippet, of the series of snippets, having the highest distinctiveness score; (ii) designating the snippet identified in (i) as a landmark; (iii) removing, from the series of snippets, the snippet identified in (i) and any snippet that overlaps the snippet identified in (i); (iv) repeating steps (i)-(iii) until no snippets are left in the series of snippets or a predetermined number of snippets are obtained; and storing, in computer memory: multiple landmarks and data about the location of each landmark. In certain embodiments, the data about the location of each landmark may include a relative location with respect to at least one other landmark. In certain embodiments, the distinctiveness score of a given snippet characterizes a degree of distinctiveness between the given snippet and any snippet within a predetermined area that includes the given snippet.

Another exemplary method of identifying landmarks in a road segment includes: while a first vehicle traverses a road segment, collecting data from the first vehicle to obtain a sequence of data; dividing the sequence of data into a series of overlapping data snippets, wherein each snippet is associated with a portion of the road segment; designating a first snippet of the series of snippets as a first landmark; designating a second snippet of the series of snippets as a second landmark; and storing, in computer memory, the first landmark, the second landmark, and a relative location of the second landmark with respect to the first landmark.

In any of these methods, in certain embodiments the data is collected in the time domain, and obtaining the sequence of data includes transforming the collected data from the time domain to a distance domain based on an operating speed of the first vehicle. In certain embodiments, the collected data corresponds to vertical motion of a portion (e.g., a wheel or wheel assembly) of the first vehicle or vertical displacement of a road surface. In certain embodiments, the collected data includes data associated with variations in the surface of the road segment. In certain embodiments, at least a portion of the collected data is collected by a motion sensor (e.g., an IMU) that measures motion of a portion of the vehicle. In certain embodiments, at least a portion of the collected data is collected by a profilometer attached to the first vehicle and arranged to determine a profile at least a portion of the surface of the road segment. In certain embodiments, the collected data includes data associated with variations in subsurface properties or characteristics of the road segment. In certain embodiments, at least a portion of the collected data is collected by a surface penetrating radar attached to the first vehicle and arranged to determine subsurface properties or characteristics of the road segment. In certain embodiments, the stored landmarks and the location thereof (e.g., relative location) may be used to determine a location of a second vehicle traversing the road segment. In certain embodiments a function of the second vehicle may be controlled based at least in part on the determined location. In certain embodiments, the series of snippets may include overlapping snippets. In certain embodiments, a length of each snippet and/or a spacing between consecutive snippets is dynamically varied based on a type of the road segment and/or an operating speed of the vehicle during collection of the data.

Another exemplary method of determining landmarks associated with a road for locating a vehicle's position along a road includes: collecting a continuum of data as a function of time and/or distance as a first vehicle travels along a load; identifying at least two portions of the road that are identifiably distinct from each other and all other portions of the road; determining the relative location of the at least two portions; storing, in computer memory, information related to certain characteristics of the two portions and the distance between them; providing data based at least partially on at least some of the information to a second vehicle. Additionally, the method may include: traversing the road with the second vehicle and locating the position of the second vehicle along the road based at least partly on the information that was provided to the second vehicle. In certain embodiments, the obtained data sequence may be divided into a first series of non-overlapping snippets.

In another aspect, a method of operating a vehicle is disclosed that includes: using a first localization system (e.g., a GPS), identify an approximate location of the vehicle; based on the approximate location of the vehicle, identifying a road segment upon which the vehicle may be traveling; accessing a database containing a plurality of landmarks; determining whether any of the landmarks in the database are associated with the road segment upon which the vehicle is traveling; upon determining that none of the landmarks in the database are associated with the road segment, initiating a landmark identification mode, wherein in the landmark identification mode, one or more landmarks are identified using any of the methods described herein.

In another aspect, a method of operating a vehicle is disclosed that includes: using a first localization system (e.g. GPS and/or any of the systems described herein) to identify a location of the vehicle; accessing a database that contains microclimate data as a function of location; determining, based on the microclimate data contained in the database, a particular microclimate associated with the location of the first vehicle; and adjusting one or more parameters of a vehicular system based at least in part on the determined particular microclimate. In certain embodiments, adjusting one or more parameters of the vehicular system comprises adjusting an operating parameter of a controllable suspension system of the vehicle. In certain embodiments, adjusting one or more parameters of the vehicular system comprises adjusting performance settings of a propulsion system of the vehicle. In certain embodiments, the method includes: prior to using the first localization system to identify the location of the first vehicle: traversing a plurality of locations in a second vehicle, wherein the second vehicle is equipped with a sensor (e.g., a humidity sensor, air and/or road temperature sensor, camera) configured to collect atmospheric data; collecting microclimate data from the sensor as the second vehicle traverses the plurality of locations; and storing, in the database, the collected microclimate data as a function of location.

In another aspect, a method of operating a vehicle is disclosed that includes using a first localization system (e.g., a GPS), to determine an approximate location of the vehicle followed by identifying a road segment upon which the vehicle may be traveling at least partially based on that approximation. This method may also include accessing a database containing information about a plurality of road surface-based landmarks associated with the identified road segment, receiving information about a first and a second landmark from the database and the relative distance between the first and the second landmarks. This method may further include determining a more precise location of the vehicle on the road by matching vertical displacement experienced by a portion of the vehicle, while driving on the road segment, with the characteristics of the first landmark. The portion of the vehicle may be a wheel, a wheel assembly or a segment of the vehicle body. The method may also include projecting an anticipated encounter with a second landmark based on information about the relative distance between the first and the second landmarks also obtained from the database and on the basis of dead-reckoning between landmarks. The method may also include matching vertical displacement subsequently experienced by a portion of the vehicle with the characteristic of the second landmark, and then updating the location of the vehicle on the road based on the location of the second landmark relative to the first landmark.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various nonlimiting embodiments when considered in conjunction with the accompanying figures. In cases where the present specification and a document incorporated by reference include conflicting and/or inconsistent disclosure, the present specification shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
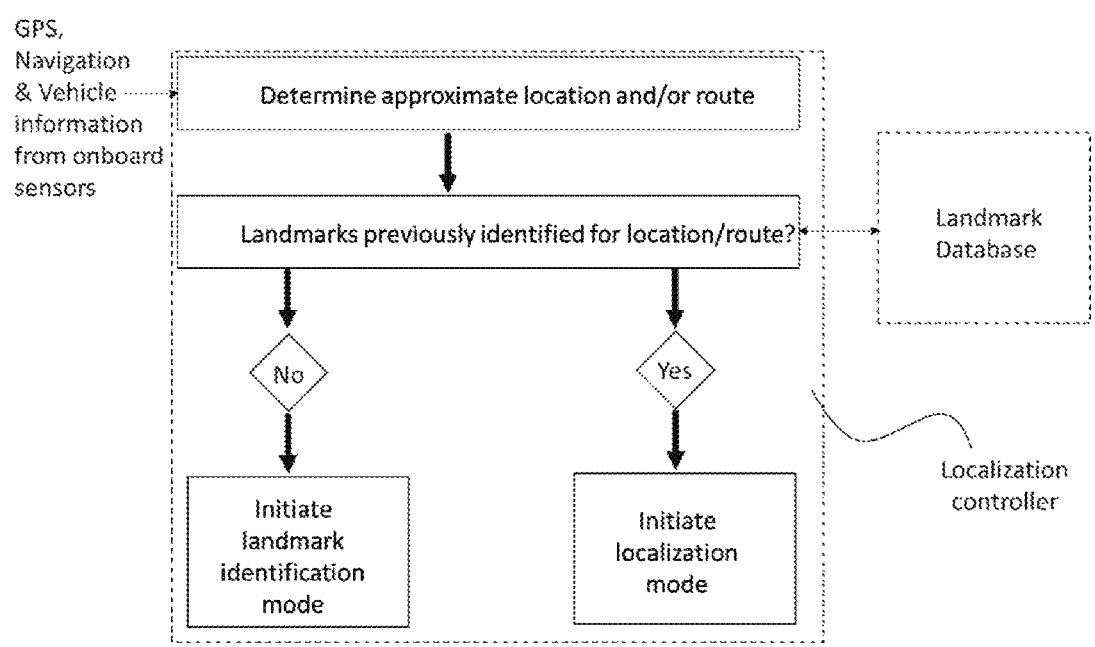
FIG. 1 illustrates an embodiment of a method for localizing a vehicle.

A variety of advanced vehicle functions including, for example, autonomous or semi-autonomous driving features, rely on systems and methods capable of accurate, high resolution (e.g., sub 1-meter resolution), and repeatable localization of the vehicle. Conventional GPS-based localization systems generally do not provide sufficient resolution or accuracy for use in, for example, autonomous vehicles. Further, such GPS-based localizations are especially prone to error or failure in situations where (a) signal transmission may be partially blocked due to, for example, tunnels, surrounding buildings, tree cover, mountains, etc. and/or (b) several possible tracks have overlapping coordinates (e.g., as in the case of an elevated highway running over a surface street, GPS may be unable to distinguish whether the vehicle is located on the elevated highway or the surface street underneath).

Recently, various landmark based localization approaches have been investigated, including, for example, visual landmark-based localization. However, these landmark-based techniques generally rely on a priori knowledge of the precise, absolute location of a set of landmarks. Collection of such location data may be time consuming and may require costly equipment capable of determining absolute location to a high degree of accuracy. Additionally, such localization-based approaches are subject to failure in the event that a particular landmark is relocated or removed, and/or when a new route is travelled for which landmarks have not yet been georeferenced.

In light of the above, the inventors have recognized the need for landmark-based localization methods and apparatuses that do not require prior knowledge of the absolute location of a set of landmarks. Particularly, the inventors have developed methods and apparatuses for automatically finding identifiable landmarks from data that may be obtained during traversal of a particular route by a vehicle. In certain embodiments, relative locations of each landmark, as opposed to absolute locations, may be stored in a database. Storing relative locations instead of the absolute location for each landmark may obviate the need for specialized equipment (e.g., differential GPS) capable of determining absolute location to a high accuracy. Further, methods and apparatuses for dynamically updating databases of landmarks are disclosed.

In one embodiment, a method for identifying landmarks may include obtaining a sequence of data that is collected by a vehicle as it traverses a route. The obtained data sequence may then be divided into a series of overlapping data segments, alternatively referred to herein as "snippets." A plurality of landmarks may be identified from the series of snippets, wherein each landmark may be a particular snippet of the series of snippets. In certain embodiments, a distinctiveness score may be calculated for each snippet. The distinctiveness score of any given snippet may describe the degree of distinctiveness of that snippet as compared to nearby or surrounding snippets. In certain embodiments, the distinctiveness score may be determined using, for example, a distance metric, or the inverse of a similarity measure or similarity function, as are known in the art. In certain embodiments, a plurality of snippets may be designated as landmarks based, at least in part, on the respective distinctiveness scores. In certain embodiments, no two overlapping and/or no two abutting snippets are identified as landmarks. In certain embodiments, a relative location of each landmark may then be stored (e.g., in a database). After identifying a plurality of landmarks, the relative location of each landmark may be stored, for example, as a distance between a given landmark and another identified landmark of the plurality of landmarks.

In various embodiments, the sequence of data may be obtained in a distance domain (e.g., as a function of distance travelled along the route), or it may be obtained in a time domain (e.g., as a function of time of driving) and then transformed into the distance domain. In certain embodiments, data may be collected periodically (e.g., at 100 Hz) as a vehicle traverses the route to yield a sequence of data in the time domain. Additionally, in certain embodiments the speed of the car as it traverses the route may also be obtained. Based on the speed of the car, the sequence of data in the time domain may be transformed to yield the sequence of data in the distance domain.

In an exemplary embodiment, the obtained sequence of data may correspond to, or be a function of, vertical motion of one or more portions of a vehicle such as, for example, one or more wheels or wheel assemblies of a vehicle as the vehicle traverses the route. This data may be collected by a motion sensor (e.g., an IMU, an accelerometer) attached to, for example, a wheel, wheel assembly, or another portion of the vehicle. Methods which utilize motion induced by the vertical motion of one or more wheels of a vehicle may be referred to as surface-based localization, since the vertical motion may arise due to features of a road surface over which the vehicle travels. Surface-based localization may offer several advantages, especially when combined with other, less precise, localization systems (e.g., GPS). First, road surface characteristics are likely to remain unchanged for prolonged periods of time. Second, unlike, for example, visual landmark identification (which may become increasingly difficult under low-light or other low-visibility conditions (e.g., due to rain, snow, time of day, etc.)), the detection of surface characteristics is likely to be unaffected by low-light or low-visibility conditions.

In embodiments of localization systems disclosed herein, landmarks may be, for example, road surface-based. Such landmarks may be, for example, based on data collected by sensors (such as, for example, accelerometers, IMUs, and/or displacement sensors) that respond at least to road-induced vertical components of displacement, velocity, and/or acceleration of portions of a vehicle. Such portions of the vehicle may include, for example, one or more wheels, wheel assemblies, and/or segments of the vehicle body. In some embodiments, the road surface features that may induce such motions (that may be used for road surface-based localization) may have a maximum vertical dimension of, for example, one meter or less, 0.1 meters or less, 0.01 meters or less, or 0.001 meters or less.

Turning now to the figures, several non-limiting embodiments are now described in detail. FIG. 1 illustrates a method for initiating landmark identification in a vehicle travelling along a route. In a first step, GPS (or another suitable localization system) may be utilized to determine an approximate location of a vehicle. Optionally, the approximate location may be matched to an approximate position along a given road. In certain embodiments, a planned route of the vehicle may be known (e.g., based on navigation settings, driving history, etc.). In certain embodiments, the approximate location, approximate position along the given road, and/or the planned route may be communicated to a controller. The controller may be located locally within or on the vehicle, or it may be located remotely and the communication may occur over a wireless network (e.g., WiFi, cellular network, etc.). The controller may have access to a database containing landmarks and approximate locations for each landmark.

In certain embodiments, the controller may access the database in order to determine whether any landmarks have previously been identified and/or stored near the approximate location, along the given road, or along the planned route. Upon determining that landmarks have been previously identified and/or stored, the controller may initiate a localization mode. Conversely, upon determining that no landmarks have been previously identified and/or stored near the approximate location of the vehicle, along the planned route, and/or along the given road, the controller may initiate a landmark identification mode.

In certain embodiments, landmarks may be direction specific. In these embodiments, in addition to being associated with a location, each landmark is also associated with a direction of travel. In these embodiments, the direction of travel of the vehicle may be determined (e.g., using GPS, dead reckoning, or pre-planned navigation routes), and the controller may access the database to determine whether any landmarks have previously been identified along the route of the vehicle and in the direction of travel of the vehicle. In certain embodiments, landmarks may be lane specific (that is, they may be associated with a specific lane of a road). In these embodiments, a lane of travel of the vehicle on a given road may be determined (e.g., using vision-based lane identification systems), and the controller may access the database to determine whether any landmarks have previously been identified for the lane of travel. In certain embodiments, landmark identification mode may be manually initiated.

Figure 2:
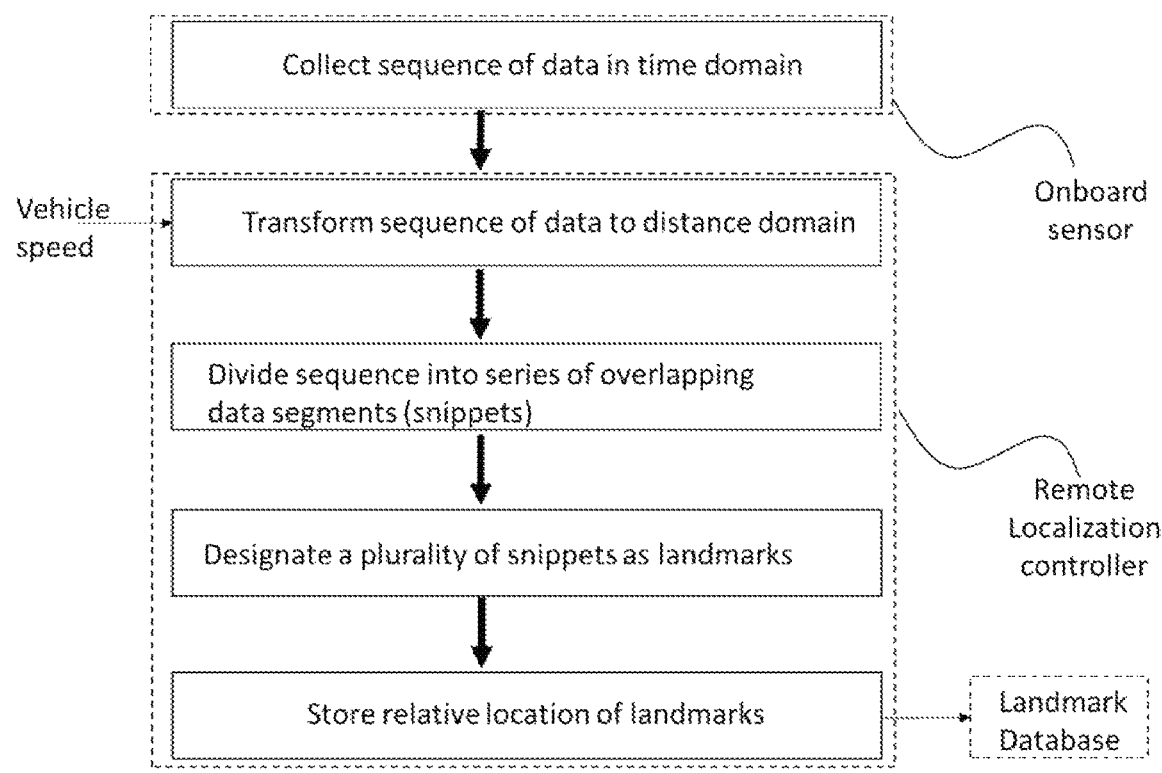
FIG. 2 depicts a flow chart of an embodiment of a method for identifying landmarks.

FIG. 2 depicts a flow chart of an exemplary process for identifying landmarks. In a first step, a sequence of data is collected while a vehicle traverses a route. The sequence of data may consist of data points that are collected periodically during traversal of the route. In certain embodiments, the data points that make up the sequence of data may be collected at regular time intervals (e.g., corresponding to sampling rates of 0.1-1 Hz, 1 Hz-10 Hz, 1-Hz-100 Hz, or 100 Hz-1,000 Hz). In certain embodiments, the data points that make up the sequence of data may be collected at regular distance intervals (e.g., 1-5 cm, 5-50 cm, or 50-100 cm). In certain embodiments, the data points may be collected at regular time intervals and may be transformed, with knowledge of the vehicle's operating speed, from the time domain into the distance domain. In an exemplary embodiment, each data point may correspond to vertical wheel motion (e.g., velocity or acceleration) as measured by a motion detector (e.g., an IMU, an accelerometer) arranged to detect motion (e.g., position changes, velocity, acceleration) of a wheel or wheel assembly of the vehicle. In other embodiments, each data point may correspond to suspension position. In other embodiments, each data point may correspond to an elevation of a road surface. In other embodiments, each data point may correspond to any parameter that can be periodically sensed as the vehicle traverses the route (e.g, RADAR reflections of subsurface or surface features, acoustic data, visual or other electromagnetic data, etc.).

Following collection of the sequence of data, in certain embodiments, the sequence may be communicated from an onboard data collection system to a localization controller. In certain embodiments, the localization controller is remotely located (that is, it is not located onboard the vehicle). Communication from the onboard data collection system to the localization controller may occur wirelessly, e.g. over WiFi networks and/or cellular networks. In certain embodiments, the vehicle may wait until a connection is established over a WiFi network before sending the data to the remotely located controller. For example, by waiting until the vehicle is connected to a previously identified WiFi network before transferring the sequence of data, excessive data transfer over potentially slower and more costly cellular networks may be substantially avoided. The sequence may be communicated to the localization controller in the distance domain. Alternatively, as illustrated in FIG. 2, the sequence of data may be communicated to the localization controller in the time domain, along with information about the vehicle's speed. In these embodiments, the localization controller may then use the vehicle's speed information to transform the sequence of data from the time domain into the distance domain.

Figure 3:
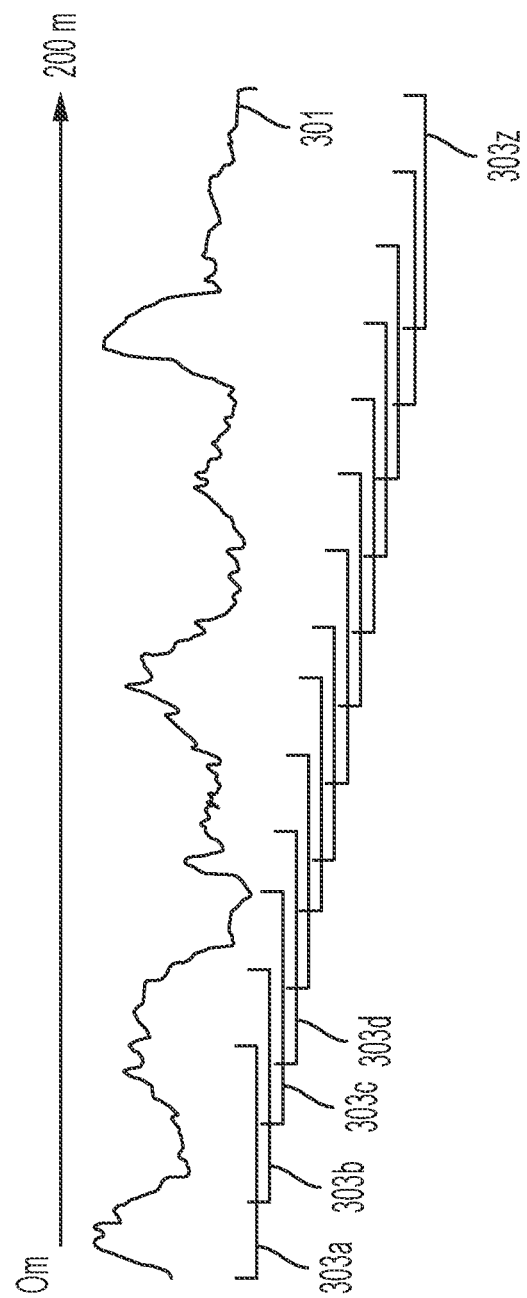
FIG. 3 illustrates an exemplary sequence of data divided into a series of data snippets.

In certain embodiments, after the localization controller obtains the sequence of data in the distance domain (either by receiving it in the distance domain, or by receiving it in the time domain and transforming it into the distance domain), the controller may store the sequence of data in memory (e.g., in a cache or other temporary memory storage). In certain embodiments, the localization controller may divide the stored sequence of data into an overlapping series of data segments, as shown in step 3 of FIG. 2. Each of these data segments may be referred to as a "snippet." In certain embodiments, each snippet may consist of a portion of the sequence of the data that corresponds to a constant distance. For example, FIG. 3 illustrates an exemplary sequence of data 301 in the distance domain. This exemplary sequence 301 includes data points collected from a vehicle traversing a 200 meter route, and the sequence can therefore be said to be 200 meters long. The 200 meter long sequence of data has been divided into a series of overlapping snippets 302*a-z*. In the illustrated example, each snippet has a length of 40 meters. In the illustrated example, the beginning of each snippet is spaced 10 meters apart, so that there are 30 meters of overlap between a given snippet and a subsequent data segment of the series. It is understood that these numbers are merely exemplary and that the sequence of data may be any length, each snippet may be any length, and the spacing between data segments may be any length.

Returning now to FIG. 2, in step 4 the controller may identify a plurality of landmarks from the series of snippets. Each landmark may be a particular snippet from the series of snippets. In certain embodiments, the identification of landmarks may be carried out so that no two landmarks overlap with one another, so that no two landmarks abut one another, and/or so that there is a minimum distance between the end of any one landmark and the start of any other landmark. Following identification of the plurality of landmarks, in step 5 of the method illustrated in FIG. 2, the relative location of each landmark may be stored in a database. For example, the relative location of a given landmark may be stored as a distance between the given landmark and a reference location. Alternatively, the relative location of a given landmark may be stored as a distance between the given landmark and another landmark of the plurality of landmarks. By storing relative locations as opposed to absolute locations, the need for localization systems capable of precisely determining absolute locations (e.g., differential GPS) may be obfuscated. Additionally, each landmark may be associated with a direction of travel, a lane of travel, and/or a type of vehicle.

Figure 4:
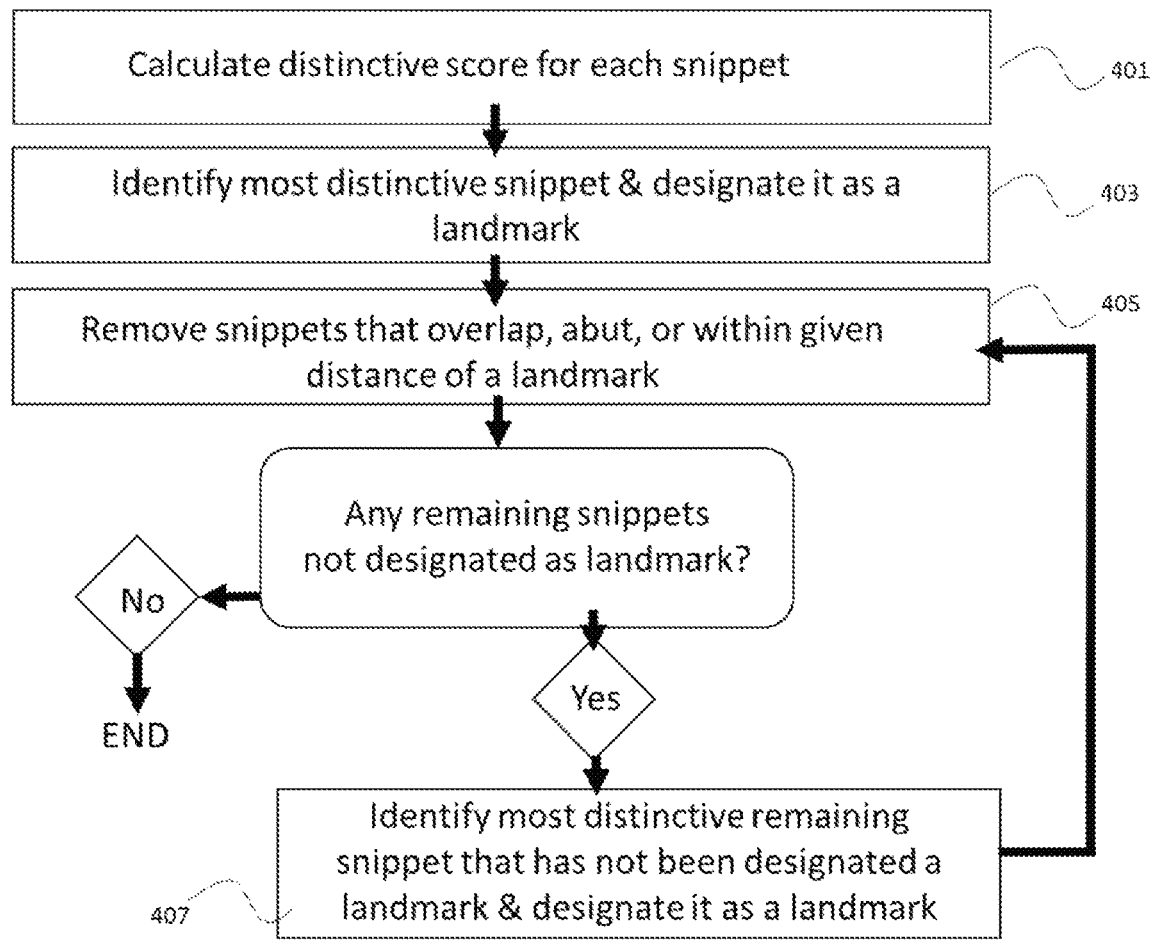
FIG. 4 illustrates an embodiment of a method for identifying a plurality of landmarks from a data sequence.

Various methods may be used for identifying landmarks from the series of snippets. FIG. 4 illustrates an exemplary iterative method for identifying a plurality of landmarks from the series of snippets. In a first step 401 of the illustrated method, a distinctiveness score is calculated for each snippet. The distinctiveness score may represent how distinct a snippet is as compared to overlapping, surrounding and/or nearby snippets. In a second step 403 of the exemplary method, the most distinctive snippet (e.g., the data segment/snippet with the largest distinctiveness score) is identified and designated as a first landmark. In a third step 405 of the exemplary method, any snippets that overlap the first landmark are removed from consideration as potential landmarks. Optionally, any snippets that abut a landmark or are within a certain distance from the first landmark may also be removed from consideration as potential landmarks. In a fourth step 407 of the exemplary method, the most distinctive snippet that has not yet been (a) removed from consideration or (b) already designated a landmark is identified as a second landmark. Any snippets that overlap the second landmark, that abut the second landmark, and/or that are within a certain distance from the second landmark may be removed from consideration. The steps of identifying as a landmark the most distinctive snippet that has not yet been removed from consideration or already identified as a landmark, followed by removing from consideration overlapping, abutting, or nearby snippets may be iteratively repeated such that a plurality of landmarks are identified form the original series of snippets. In certain embodiments, the steps may be repeated until there are no snippets remaining that have not yet been removed from consideration or designated as a landmark. In other embodiments, the steps may be repeated until a certain number of landmarks have been identified, or until a certain density of landmarks have been identified.

Different types of roads may, in general, contain different types of road features. For example, freeways may have surfaces that are relatively flat and uniform when compared to other types of road surfaces (e.g., city streets that may be more prone to potholes, cracks, or other defects, or may be designed to intentionally include speed bumps or the like). In certain embodiments, the algorithm used to determine the distinctiveness score for each snippet may be varied based on the type of road being travelled and/or based on an operating speed of the vehicle when the sequence of data was collected. For example, in an exemplary embodiment the sequence of data being collected may correspond to vertical motion that is experienced by a wheel of the vehicle traversing a route. As an example, when traversing city streets, the wheel may traverse a series of speed bumps, potholes, cracks, etc. that result in vertical motion of the wheel substantially in a certain frequency range and/or amplitude range. Therefore, when determining distinctiveness scores for data collected from a city street (or data collected at a first operating speed), it may be desirable to apply a filter such that snippets are evaluated for distinctiveness primarily in a first frequency range. On the other hand, when traversing a freeway, the wheel may traverse a relatively smoother surface that results in vertical motion of the wheel substantially in a different frequency range and/or amplitude range. Therefore, when determining distinctiveness scores for data collected from a freeway (or data collected at a second operating speed), it may be desirable to apply a different filter such that snippets are evaluated for distinctiveness primarily in a second frequency range. As disclosed herein, the type of road being travelled may be identified, for example, by using a map or other database that stores road information, a forward looking sensor, or by analyzing data collected during traversal of the road. In certain embodiments, machine learning algorithms may be utilized (e.g., a neural network may be trained using known roads of different types) to recognize road type based on any data collected from the road.

Figure 5:
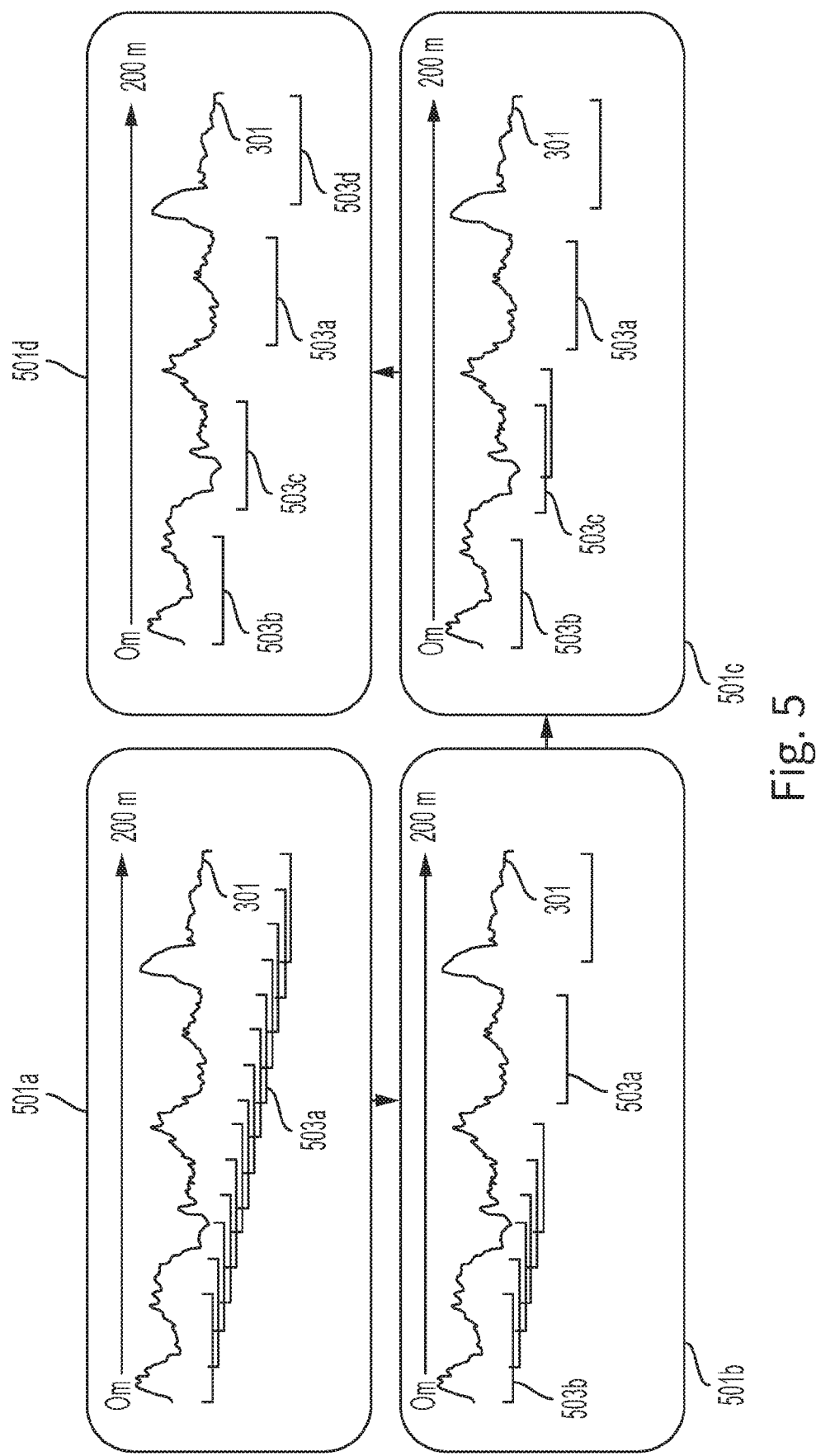
FIG. 5 illustrates an embodiment of a method for identifying a plurality of landmarks applied to an exemplary data sequence.

FIG. 5 illustrates the above described method of landmark identification as applied to an exemplary sequence of data 301. In panel 501a, the sequence of data 301 has been be divided into a series of overlapping snippets, and a distinctiveness score is determined for each snippet. As discussed herein, the length of each snippet and/or the algorithm used for determining the distinctiveness score may be determined based on a variety of factors, including for example road type being traversed or a speed at which the sequence of data was collected. The most distinctive snippet 503a has been identified and designated a first landmark. Any snippet that overlaps with or abuts the first landmark 503a may then be removed from consideration, as shown in panel 501b. The most distinctive remaining snippet that has not already been designated a landmark is then identified as segment 503b, and it is designated a second landmark. As shown in panel 501c, any snippet that overlaps or abuts the second landmark 503b is removed from consideration, and the most distinctive remaining snippet that has not already been designated a landmark is identified as segment 503c and designated a third landmark. As shown in panel 501d, any snippet that overlaps or abuts the third landmark 503c is removed from consideration, and the most distinctive remaining snippet that has not already been designated a landmark is identified as segment 503d, which is designated a landmark. As no additional snippets remain that have not been designated a landmark, the landmark identification process is complete. The location of each landmark may be stored in a database for subsequent use in landmark-based localization.

In certain embodiments, the length of each snippet that is evaluated as a potential landmark may be varied based on type of road. For example, on freeways, in order to identify snippets having sufficiently distinctive features for localization, it may be advantageous to use snippets of a longer length than used on non-highway roads such as, for example, city streets. Therefore, in certain embodiments, a type of road being travelled may be identified by a controller, and the length of each snippet evaluated as a possible landmark and/or the length of each landmark that is identified and stored may be varied based on the type of road. The type of road being travelled may be identified using, for example a GPS or other localization system in conjunction with a map, a look-ahead sensor (e.g., a camera, LIDAR, or RADAR), or it may be inferred based on vehicle parameters such as operating speeds or vertical wheel travel (for example, a vehicle travelling on a relatively smooth road such as a highway may experience less vertical wheel travel than a vehicle travelling on a relatively rough road such as a city street) Likewise, when the vehicle is travelling at relatively fast operating speeds, the time it takes the vehicle to traverse a given length decreases. Therefore, when a vehicle is travelling at a relatively fast operating speed, it may be advantageous to extend the length of each snippet and each identified landmark. Therefore, in certain embodiments, the length of each snippet evaluated as a possible landmark and/or the length of each landmark may be varied based on either the type of road, or based on an average operating speed of a vehicle on a given road.

In an alternative method for identifying landmarks, the sequence of data may be divided into sequential, non-overlapping segments of approximately equal length. For example, a 1 km long sequence of data may be divided into 5 segments, each having a length of 200 meters. Each segment may then be divided into a series of overlapping data snippets (e.g. each snippet having a length of 40 meters). A distinctiveness score may be calculated for each snippet, and the most distinctive snippet within each segment may be identified as a landmark.

In certain embodiments, a location of each landmark may be stored in a database. In certain embodiments, the location of a landmark may be stored as a relative location (e.g., as a distance between a given landmark and the preceding landmark). Storing relative locations instead of the absolute location for each landmark may obviate the need for specialized equipment (e.g., differential GPS) capable of determining absolute location to a high accuracy, and may further allow for dynamic in-situ identification of landmarks. In other embodiments, the location of a landmark may be stored as an absolute location. In certain embodiments, the landmark may also be associated in the database with a direction of travel, a speed of travel, and/or with a specific lane or lateral position on a road surface. In certain embodiments, the landmark may be associated in the database with a specific type or model of vehicle. Therefore for each identified landmark, the database may store the landmark (e.g., the data points that make up the data segment that was identified as a landmark) and location data (e.g., relative location) for the landmark, along with one or more of: a direction of travel, a speed of travel, a particular lane, and/or a vehicle type.

In certain embodiments, a vehicle location may be determined by recording a sequence of data as the vehicle is travelling along a route, and comparing a portion of the recorded sequence of data to one or more landmarks stored in the database. In the past, pre-emptively geolocated discrete landmarks, such as trees, buildings and other discrete and identifiable physical objects, have been used to aid in determining the location of, for example, a mobile robot. Inventors have recognized that in the case of a vehicle travelling on a road, landmarks may be picked out of a continuum of potential landmarks, such as a road surface, by discretizing them and determining their distinctiveness.

In certain embodiments, one or more parameters of the vehicle may be adjusted based on the determined location of the vehicle. For example, one or more control parameters of an active suspension system of a vehicle (e.g., a suspension system that suspends a vehicle body relative to the wheels of the vehicle, or a suspension system that suspends a seat of the vehicle relative to the vehicle body) may be adjusted based on the vehicle location. In certain embodiments, a map or other database may be utilized that contains road surface information as a function of location, and one or more control parameters of the vehicle may be adjusted based on the determined location of the vehicle and on the road surface information corresponding to the determined location.

For example, a certain road or portion of the road may be identified as being rough, as being smooth, or as having a features such as of potholes, manhole covers, bumps, etc. When a vehicle is identified as travelling along said road or portion thereof, one or more control parameters of the vehicle (e.g., one or more control parameters of an active suspension system of the vehicle) may be adjusted. As a more particular example, in a vehicle having an actively suspended seat, it may be desirable to isolate the seat from road induced vertical motion of the vehicle body when the vehicle is travelling along very rough roads or surfaces. However, isolating the seat to such an extent when travelling on a relatively smooth road may result in the seat having an unnatural response. Therefore, based at least in part on both the determined location of the vehicle and road surface information (e.g., on a road roughness measurement) associated with the determined location (and, e.g., stored in a map or other database), a control parameter (e.g., a gain associated with a control scheme (e.g., a feedback control scheme (e.g., a skyhook based control))) of the active suspension system of the seat may be adjusted.

In another aspect, systems and methods are disclosed for identifying microclimates and/or for controlling a vehicle component based on an identified microclimate. As understood in the art, a microclimate is understood to refer to an area within which localized atmospheric conditions may differ from those of adjacent or nearby areas. For example, a series of tall buildings on a certain street may block sun from reaching a certain area, and/or may channel strong winds in a given area. As a result, within a given area near the series of tall buildings, the atmospheric conditions (e.g., temperature, wind levels) may substantially differ from adjacent areas. It is known, for example, that due to the city's varied topography and geography, temperatures in San Francisco can vary by as much as 9° F. (5° C.) from one block to an adjacent block.

As a vehicle travels from an origin to a destination, the vehicle may pass through a plurality of different microclimates. In one embodiment, the vehicle may include one or more sensors capable of detecting atmospheric conditions. The one or more sensors may include, for example, a temperature sensor, a humidity sensor, and/or a radiometer (e.g., an ultraviolet sensor for detecting the intensity of UV light). The vehicle may also include a localization system (e.g. a GPS system) capable of determining a location of the vehicle. As the vehicle is operated, the one or more sensors may be used to determine and report one or more atmospheric conditions at one or more locations. In certain embodiments, a current location of the vehicle and the one or more atmospheric conditions detected at the current location may be communicated from the vehicle to a remotely located processor or set of processors. The one or more atmospheric conditions may be recorded or overlaid, by the processor or set of processors, on a map. In various embodiments, the map may be centrally located to the vehicle or it may be remotely located (e.g., it may be on the cloud). In certain embodiments, a plurality of vehicles, each including one or more sensors capable of detecting atmospheric conditions, may be utilized to detect and report one or more atmospheric conditions at a plurality of locations simultaneously. A processor or set of processors may receive the reported atmospheric conditions from each vehicle of the plurality of vehicles, and may aggregate the data. In certain conditions, the processor or set of processors may identify different microclimates based on changes in atmospheric conditions reported from different locations, and a location of the identified microclimates may be recorded or overlaid on a map.

Particular examples of microclimates may include, for example, areas of relatively high crosswinds (e.g., due to the presence of buildings or natural formations that channel wind to a given area), areas of high or low humidity (e.g., due to proximity to a river or lake), areas prone to ice or snow formation (e.g., due to blockage of sun buildings or other obstacles), areas prone to water accumulation (e.g., due to proximity to a river, lake, pond, and/or due to being at low relative elevations), etc. Hazards that may be unique to a certain microclimate may include, for example, "slippery" roads (e.g., due to a road surface having a lower friction coefficient, due to, for example, localized black ice, high humidity, snow, temperature changes causing oil to be released from roads, etc.) and/or an increased potential for hydroplaning due to, for example, flooding or water accumulation;

The inventors have recognized that microclimates may impact performance of various components of a vehicle. For example, air pressure within a tire varies as ambient temperature changes. Likewise, humidity levels may affect properties of the road surface, and consequently may affect adhesion characteristics between a tire of a vehicle and the road surface on which the vehicle travels. The inventors have therefore recognized the benefit of adjusting parameters of vehicular components based on a microclimate within which the vehicle is currently located. In one embodiment, a vehicle includes a localization system capable of identifying an approximate location of a vehicle. Many such localization systems are known in the art (e.g., a GPS, a visual localization system, a landmark based localization system, etc.). The vehicle may use the localization system to identify its current location. The vehicle may identify a microclimate (e.g., a humidity level, a localized presence of ice/snow, a road or air temperature, a presence of high winds, etc.) at a specific location by accessing a database (e.g., a map or other table) that contains microclimate information as a function of location. Alternatively, a vehicle may identify a microclimate through use of one or more sensors that can detect environmental conditions (e.g., humidity sensors, air temperature sensors, road temperature sensors, cameras, etc.).

In certain embodiments, a first vehicle may include a variety of sensors that can detect data related to microclimate. The first vehicle may collect data related to microclimate while the vehicle is traversing a given route, and the first vehicle may communicate one or more characteristics of microclimate and an associated location to a remote database. The remote database may then communicate the one or more characteristics to other vehicles that are near the associated location, such that when another vehicle traverses the associated location it is able to predictively identify the microclimate at a given time based on the data.

Based at least in part on the determined microclimate (or a characteristic thereof), the vehicle may adjust one or more parameters that affect operation of a vehicular component. For example, a semi-active or active suspension system may adjust a damping curve of the suspension system based at least in part on the determined microclimate. For example, in microclimates characterized by increased likelihood of slippage or loss of road traction, the suspension system may be tuned to maximize road holding ability by stiffening the damper curve. As another example, in order to resist effects of high crosswinds, an active suspension system may be adjusted to favor body holding during operation. As another example, the vehicle may adjust performance settings of the propulsion system (e.g., the engine or other motor of the vehicle) based on the microclimate. For example, humidity levels, ambient temperatures, and/or the presence of high winds may affect how effective cooling of the propulsion system is. In microclimates where cooling is more efficient, the propulsion system may be operated more aggressively than in microclimates where overheating may be more likely.

In certain embodiments, the vehicle may respond to identification of a given microclimate by alerting an occupant of the vehicle. In this way, the vehicle may alert the occupant that hazardous conditions are likely, such as flooded roads, slippery roads, snow drifts, etc. In certain embodiments, the vehicle may alert the driver by using an actuator of an active suspension system to vibrate the vehicle. If the occupant is a driver of the vehicle, such an alert may allow for the driver to change lanes or to increase caution in operating the vehicle.

In certain embodiments, a route planning system that includes a processor may take microclimates of potential routes into account. In these embodiments, an occupant of the vehicle may indicate a desired destination through a user interface that communicates with the processor. Based on a current location of the vehicle and the desired destination, the route planning system may access a map to determine a plurality of candidate routes. The route planning system may access a database that identifies microclimate information for each of the candidate routes. Based on the identified microclimate information for each of the candidate routes, the route planning system may select one or more candidate routes as preferred. For example, if one of the candidate routes is prone to flooding and/or currently flooded, the route planning system may select a different candidate route, that is not prone to flooding and/or currently flooded, as the preferred route. In certain embodiments, the route planning system may display the preferred route to the occupant (either by itself, or along with other candidate routes), and may (e.g., upon selection by the occupant) direct the occupant to follow the preferred route. In certain embodiments, the vehicle may be autonomous or semi-autonomous and may traverse the preferred route using an autonomous steering and driving system.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The invention claimed is:

1. A method for identifying landmarks associated with a surface of a road segment, the method comprising:
    with a GPS receiver, determining that a first vehicle is traversing the surface of the road segment;
    while the first vehicle traverses the road segment, receiving a sequence of data from a sensor located in the first vehicle, wherein the sensor is selected from the group consisting of an accelerometer, an inertial motion unit, and a displacement sensor, wherein the sequence of data corresponds to vertical motion of a portion of the first vehicle induced by the surface of the road segment, and wherein the portion is selected from the group consisting of a wheel, a wheel assembly and a vehicle body;
    dividing the sequence of data into a first series of snippets, wherein each snippet in the first series is associated with a portion of the road segment;
    determining a distinctiveness score for each snippet;
    identifying a first snippet, wherein the first snippet has a highest distinctiveness score of the first series of snippets;
    designating a first portion of the surface of the road segment associated with the first snippet as a first landmark;
    removing, from the first series of snippets, at least the first snippet and any snippet that overlaps with the first snippet, to form a second series of snippets;
    identifying a second snippet, wherein the second snippet has a highest distinctiveness score of the second series of snippets;
    designating a second portion of the road segment associated with the second snippet as a second landmark;
    storing, in computer memory, information characterizing the first landmark and the second landmark, and a location of the first landmark relative to a location of the second landmark;
    determining a location of a second vehicle based at least on a portion of the information while the second vehicle is traversing the surface of the road segment; and
    controlling at least one system of the second vehicle based on the determined location.

2. The method of claim 1, further comprising locating the second vehicle relative to the first and the second landmarks based on at least a portion of the information.

3. The method of claim 1, wherein the location of the first landmark is stored as a relative location with respect to a location of a previously identified landmark.

4. The method of claim 1, wherein the at least one system comprises at least one of the following: an active suspension system of the second vehicle, a propulsion system of the second vehicle, and an autonomous steering and driving system of the second vehicle.

5. The method of claim 1, wherein the at least one system comprises an active suspension system of the second vehicle, and wherein controlling the active suspension system comprises adjusting a damping curve of the active suspension system.

6. A method of creating a database of road surface landmarks associated with a road segment, the method comprising:
   operating a first vehicle to traverse a road segment;
      receiving a sequence of data sensed by a sensor located in the first vehicle during the traversal of the road segment by the first vehicle, wherein the sensor is selected from the group consisting of an accelerometer, an inertial motion unit, and a displacement sensor, wherein the sequence of data corresponds to road surface information based on vertical motion of a portion of the first vehicle induced by a surface of the road segment, and wherein the portion is selected from the group consisting of a wheel, a wheel assembly and a vehicle body;
   dividing the sequence of data into a first series of overlapping snippets, wherein each snippet in the first series of overlapping snippets is associated with a portion of the road segment;
   determining a distinctiveness score for each snippet;
   identifying a first snippet, wherein the first snippet has a highest distinctiveness score of the first series of overlapping snippets;
   designating a first portion of the surface of the road segment associated with the first snippet as a first landmark;
   removing, from the first series of overlapping snippets, at least the first snippet and any snippet that overlaps with the first snippet, to form a second series of overlapping snippets;
   identifying a second snippet, wherein the second snippet has a highest distinctiveness score of the second series of overlapping snippets;
   designating a second portion of the road segment associated with the second snippet as a second landmark; and
   storing, in the database, information characterizing the first landmark and the second landmark.

7. The method of claim 6, further comprising converting the sequence of data from a time domain to a distance domain, wherein the sequence of data is collected periodically at regular time intervals.

8. The method of claim 7, wherein the conversion from the time domain to the distance domain is based on vehicle speed.

9. The method of claim 6, wherein the first series of overlapping snippets have a snippet length adjusted based on vehicle speed.

10. The method of claim 6, wherein the distinctiveness score is for each snippet is determined, with an algorithm, based at least partially on one of vehicle speed and a frequency of the sequence of data.

11. The method of claim 6, wherein the distinctiveness score for each snippet is determined based in part on applying a filter directed to a first frequency range.

12. The method of claim 6, wherein a relative distance between the first landmark and the second landmark is stored in the database.

13. The method of claim 6, further comprising transmitting the sequence of data to a remote localization controller.

14. A method of establishing a road surface landmark associated with a road segment the method comprising:
   operating a first vehicle to traverse a road segment;
   receiving a sequence of data sensed by at least one sensor located in the first vehicle during the traversal of the road segment by the first vehicle, wherein the at least one sensor is selected from the group consisting of an accelerometer, an inertial motion unit, and a displacement sensor, wherein the sequence of data corresponds to a vertical motion of a portion of the first vehicle induced by a surface of the road segment, and wherein the portion is selected from the group consisting of a wheel, a wheel assembly and a vehicle body;
   dividing the sequence of data into a first series of overlapping snippets, wherein each snippet in the first series of overlapping snippets is associated with a portion of the road segment;
   determining a distinctiveness score for each snippet of the first series of overlapping snippets;
   identifying a first snippet, wherein the first snippet has a highest distinctiveness score of the first series of overlapping snippets;
   designating a first portion of the surface of the road segment associated with the first snippet to be a first landmark; and
   storing information about the first landmark in a database.

15. The method of claim 14, further comprising using at least a portion of the information to determine a location of a second vehicle as the second vehicle traverses the road segment.

16. The method of claim 14, further comprising transmitting the sequence of data to a remote localization controller.

* * * * *